United States Patent
Viertel et al.

(10) Patent No.: US 6,474,717 B2
(45) Date of Patent: Nov. 5, 2002

(54) VISOR FOR VEHICLES

(75) Inventors: Lothar Viertel, Altforweiler (DE); Patrick Welter, La Chambre (FR); Didier Weiss, Guerting (FR); Horst Karg, Wolfsburg (DE); Hans-Gerhard Müller, Didderse (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/839,676

(22) Filed: Apr. 20, 2001

(65) Prior Publication Data

US 2002/0011738 A1 Jan. 31, 2002

(30) Foreign Application Priority Data

Apr. 22, 2000 (DE) .......................................... 100 20 106

(51) Int. Cl.⁷ .................................................. B60J 1/02
(52) U.S. Cl. ................................... 296/97.11; 296/97.8
(58) Field of Search ............................... 296/97.11, 97.8

(56) References Cited

U.S. PATENT DOCUMENTS 5,004,288 A * 4/1991 Viertel et al.
5,533,776 A * 7/1996 Agro et al.
6,010,175 A * 1/2000 Bodar
6,024,399 A * 2/2000 Viertel et al.
6,220,644 B1 * 4/2001 Tiesler et al.

FOREIGN PATENT DOCUMENTS

| DE | 0 231 440 A2 | * 10/1986 |
| DE | 296 19 969 U | 1/1997 |
| EP | 0 374 582 A | 6/1990 |
| WO | WO 98 46441 A | 10/1998 |

OTHER PUBLICATIONS

EPO search report dated Jul. 30, 2001—EP App. 01 116 083.7

* cited by examiner

Primary Examiner—D. Glenn Dayoan
Assistant Examiner—Scott Carpenter
(74) Attorney, Agent, or Firm—Price, Heneveld, Cooper, DeWitt & Litton

(57) ABSTRACT

This publication describes a visor with a visor body that can be folded around the long axle leg of an L-shaped visor axle, that can be shifted parallel to said long axle leg and that is swingably positioned around a roughly vertically aligned short axle leg. Here, the short axle leg sits in a bearing block and the free terminal area of the long axle leg is positioned separably in a first bearing housing and the arrangement of the visor body is so made that it can be shifted along the long axle leg both beyond bearing block and beyond thrust bearing housing.

5 Claims, 2 Drawing Sheets

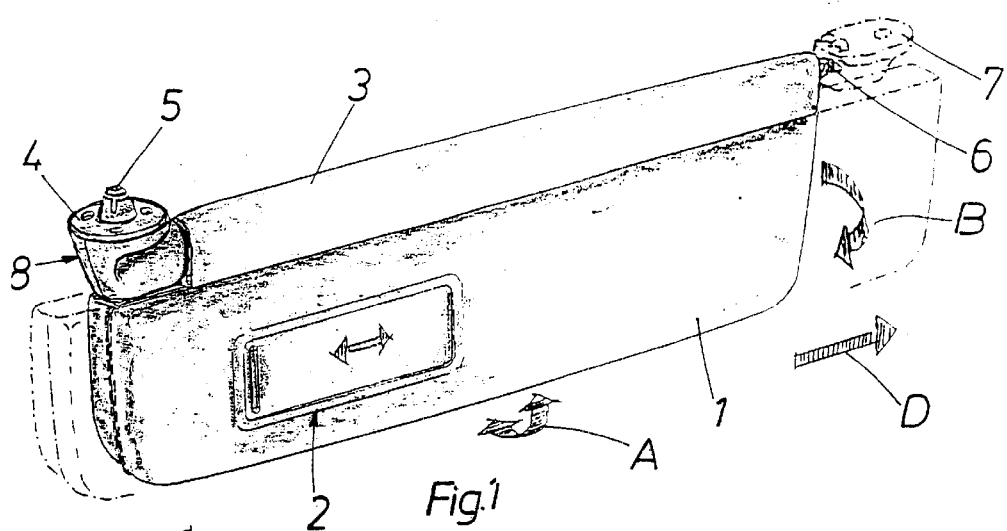
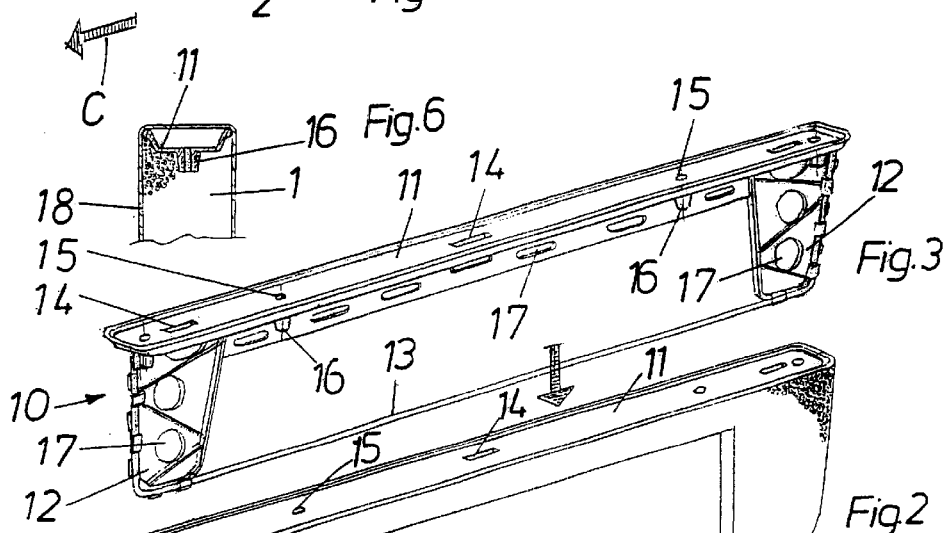
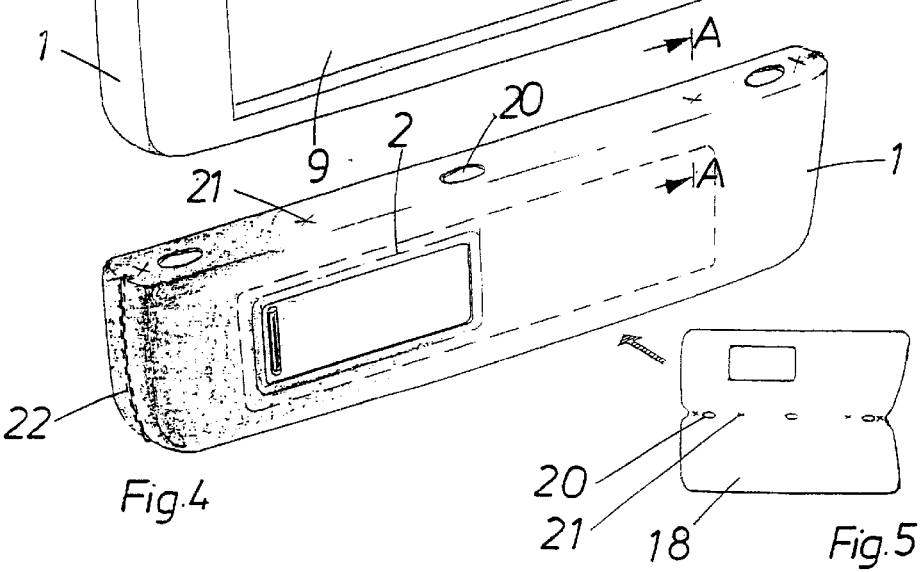

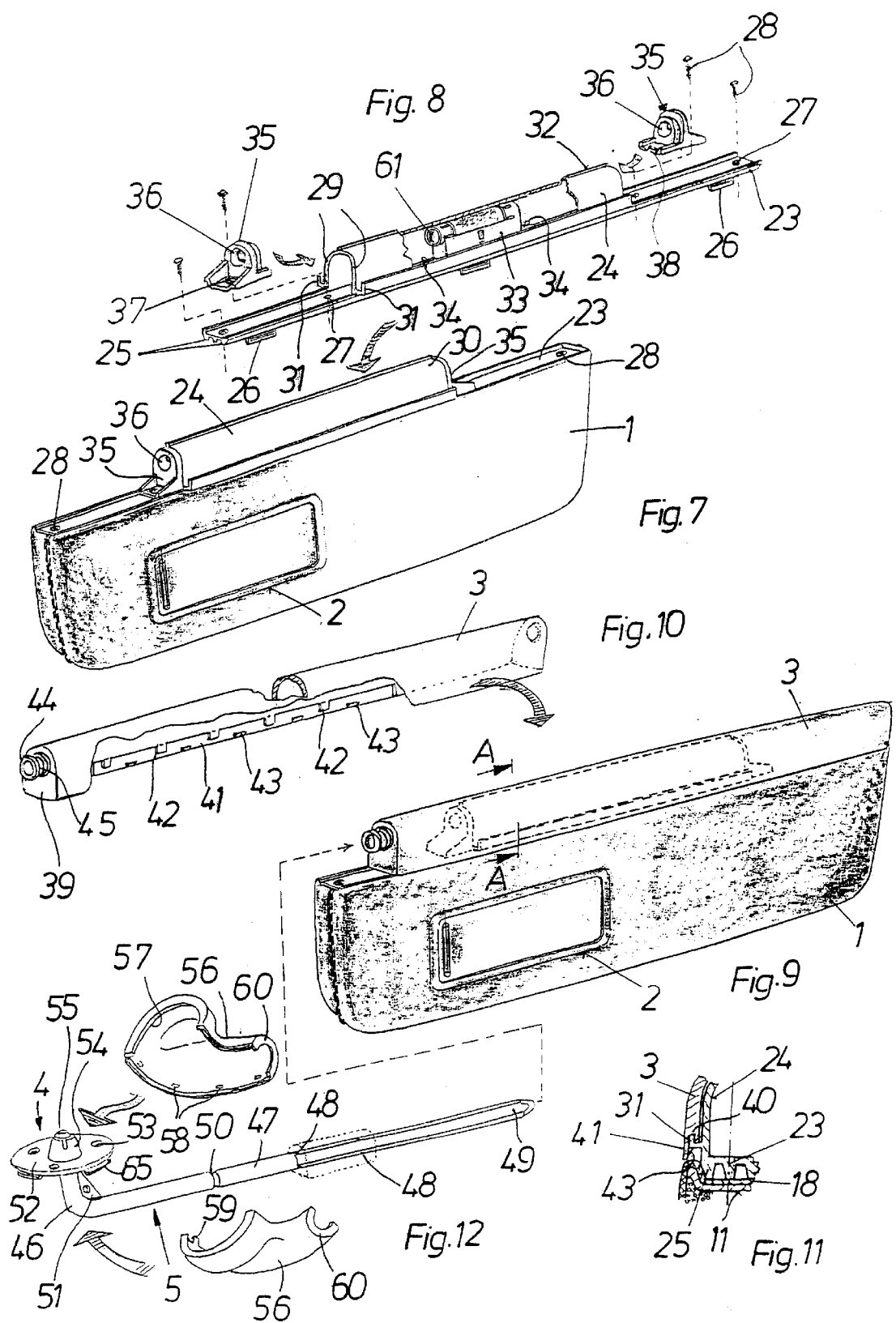

VISOR FOR VEHICLES

This invention relates to a visor for vehicles, according to the preamble of the main claim.

DE 36 03 852 A1 shows a visor for vehicles with a visor body, a guide tube, a sled, an L-shaped visor axle that has a short axle leg and a long axle leg and a bearing block that can be attached to a vehicle body and that receives the short axle leg, where the visor body along a longitudinal edge bears the guide tube, where the sled is positioned in a nonrotating manner, although in a manner axially shiftable in the guide tube and has a passage borehole in which the long leg of the visor axle is positioned rotatably, although secured against axial shifting. In this known visor, the guide tube and the sled, received therein in a shiftable manner, are arranged inside the visor body and are embedded in the visor body material so that these parts are not accessible. When the known visor is in a position offering glare protection in front of a vehicle windshield, then it is retained first of all via the bearing block that carries the visor axle and, additionally, via a thrust bearing housing into which engages separably a thrust bearing pin arranged on the visor body. In this position, the visor body can be folded from a nonuse position under the vehicle roof into a user position in front of a windshield or vice versa. On the other hand, the visor body cannot be shifted along the long axle leg of the visor axle in the direction toward the A-column or in the direction toward the longitudinal vehicle center. The visor body can be shifted along the long axle leg of the visor axle only when the thrust bearing pin is outside the thrust bearing housing, something that is the case when the visor body is swung toward a side windowpane of a vehicle. When the visor body is shifted, however, the visible visor axle is moved further into the field of vision of an observer the more the visor body is shifted away from the bearing block upon the long axle leg of the visor axle. The customers increasingly object to that as being unaesthetic.

In another visor for vehicles disclosed by DE 38 42 705 A1, the visor body can be folded around an approximately horizontal axle, can be shifted parallel to that axle and is positioned movably around a roughly vertical axle. In this known visor, however, the visor body cannot be shifted along a long axle leg of a visor axle; instead, this is to be done in the following manner: The visor body has a sliding bearing element along a longitudinal edge, which element is coupled in a nonrotating but movable fashion to a second sliding bearing element arranged on a longitudinal bearing body extending parallel to the visor body.

The object of the invention is to provide a visor of the kind mentioned initially, which will be characterized in that the visor body, regardless of whether it is located in a vehicle windshield or a vehicle side windowpane, can be shifted along the long axle leg of the visor axle specifically in one direction beyond the bearing block and in the other direction beyond the thrust bearing housing and that the slide mechanism that essentially comprises the visor axle, the sled and the guide tube is shielded from the eyes of an observer, regardless of the particular sliding position of the visor body in order in this fashion to give the visor a particularly pleasing appearance.

The measures provided in claim 1 are provided, according to the invention, in order to solve this problem.

The visor body can now—even if it is in front of a windshield—be shifted toward the A-column or the longitudinal center of the vehicle, something that is particularly important. The visor body can naturally be shifted also in both directions when it is in front of a side windowpane of the vehicle. The visor axle essentially does not become visible when the visor body is shifted. The total length of the housing and the covering hood can be coordinated with the length of the visor body so that the user will get a harmonious view, especially since one can also coordinate the thickness and a uniform transition between these parts.

The invention offers considerable advantages. With a view to aesthetic aspects, it is important to ensure that the guide means for the slide body and almost the entire long axle leg of the visor axle be encapsulated. The remaining area of the visor axle can advantageously be covered by a housing, something that makes for a particularly pretty shape.

The visor body can be made separately, checked and can be connected with the closure strip carrying the guide tube only after it is found to be good. In that way, one can keep wastage within limits.

Other advantageous developments and practical improvements of the invention are given in the subclaims.

A preferred exemplary embodiment of the invention will be explained in greater detail below with the help of the drawings.

FIG. 1 shows a complete illustrative overview of the new visor,

FIG. 2 shows the visor body of the visor, according to FIG. 1,

FIG. 3 shows an insert for the visor body,

FIG. 4 shows the visor body, according to FIG. 2, provided with an enveloping material blank and a mirror assembly, FIG. 5 shows an enveloping material blank for the visor body, FIG. 6 is a profile along line A—A, according to FIG. 4, FIG. 7 shows the visor body, according to FIG. 4, equipped along the upper longitudinal edge with a closure strip bearing a guide tube, FIG. 8 is an illustrative view of the closure strip with guide view, according to FIG. 7, equipped with sled and plug, where the guide tube is shown partly in profile and partly cut open, FIG. 9 shows the visor body, according to FIG. 7, equipped with a covering cap, FIG. 10 is an illustrative view of the covering cap shown partly in profile or cut open, FIG. 11 is a profile along line A—A, according to FIG. 9, and FIG. 12 shows the visor axle with bearing block and housing halves to be attached thereto in the form of an exploded view.

The new visor, according to FIG. 1, consists of a visor body 1 with a mirror subassembly unit 2, a covering hood 3, which remains yet to be described, a bearing block 4 to be attached in a vehicle body, a visor axle 5 with a terminal area that emerges on one end out of the covering cap and serving as thrust bearing pin 6, a thrust bearing housing 7 that is likewise to be attached to the vehicle body for the separable positioning of the thrust bearing pin 6 as well as a housing, which adjoins covering cap 3 and which is fixed on bearing block 4.

Visor body 1 can be folded upward from its illustrated user position and can also be folded back again downward, something that is to be indicated by double arrow A. Covering hood 3 participates in the particular folding motion. Visor body 1 can also be swung together with covering hood 3 from an arrangement in front of a vehicle windshield, according to directional arrow B, toward a side windowpane of the vehicle. Finally, visor body 1 can be moved out of its normal position illustrated in FIG. 1 with dashed lines, according to the directional arrow C, to the left or according to directional arrow D to the right as is also indicated with dashed lines. Here, covering hood 3 remains in its illustrated position as does bearing block 4, visor axle 5 or thrust bearing housing 7. The shift to the left, in other words, to the A-column (not shown) can amount, for example to 30 mm, or to the right, for example, 90 mm, so that one can adjust an optimum glare protection.

The visor is structured in the form of several parts. Visor body 1 is a first structural part. The latter consists of a roughly rectangular, plate-shaped body 1 made of synthetic material, in particular, synthetic foam material, where EPP proved to be particularly suitable. The corners of the roughly rectangular visor body are smoothed by rounded portions. Visor body 1, according to FIG. 2, has a depression 9 on its broad side, which is used for the recessed reception of the mirror subassembly unit 2.

To stabilize visor body 1, there is embedded in the latter a reinforcing insert 10, illustrated in FIG. 3. The reinforcing insert 10 consists of a U-shaped synthetic injection molding body with an upper frame strip 11 and legs 12. The synthetic material injection molding part, in turn, is stabilized by a U-shaped wire strap connected therewith. The frame strip has openings in the form of slits 14, or boreholes 15 as well as screw domes 16 whose purpose will be explained later. Material gaps 17 are used to permit passage of foam during the foaming of the synthetic material and thus serve for the purpose of firmly anchoring the reinforcing insert 10 in visor body 1.

Visor body 1, according to FIG. 2, is provided with a reinforcing insert 10, according to FIG. 3, of which one can recognize frame strip 11 that is made in the form of a groove (see also FIG. 6).

Visor body 1, according to FIG. 2, is enveloped with an enveloping material, for example, a leather blank 18 as shown in FIG. 5 and is equipped with a mirror subassembly unit 2 so as to get the final shape shown in FIG. 4. Leather blank 18 has a prepunched opening for the mirror subassembly unit 2 and prepunched openings 20 or cuts 21 that after the attachment of the leather blank 18 on visor body 1 are coincident with slits 14 and boreholes 15. Leather blank 18 is fixed on visor body 1 by a seam, preferably a decorative seam 22.

Another part of the new visor is a closure strip 23 in a guide tube 24. Said strip can be made in one piece with guide tube 24 from an extrusion section made of aluminum or an aluminum alloy. As shown in FIG. 8, closure strip 23 protrudes at both ends from guide tube 24, something that can be achieved by means of free-milling. When the guide tube 24 and closure strip 23 are produced separately with these parts being fitted to each other, one can of course omit the free-milling. Closure strip 23 is provided on the underside with continuing bridges 25 in a partial arrangement with bridge-shaped lugs 26 that are free-milled. Boreholes 27 in closure strip 23 when closure strip 23 is applied upon visor body 1 coincide with boreholes 15 and make it possible to screw fastening screws 28 in.

Guide tube 24 is made in a nonround manner and has two mutually parallel walls 29 that at the upper end make a transition into an arched headwall 30 and underneath into closure strip 23. Molded upon walls 29 on the outside are hook-shaped strips 31 that extend over the length of the guide tube. A bridge 32 extends outside along the headwall 30.

Inside guide tube 24, there is arranged in a longitudinally movable manner a sled 33 that is adapted to the opening profile of guide tube 24, which sled at its ends has protruding, molded-on catch noses 34. With the exception of catch noses 34, sled 33 can have the kind of shape that is shown and described in DE 36 03 852 A1 or DE 197 22 259 C1.

As shown in FIG. 8, sled 33 is introduced into guide tube 24 after which guide tube 24 is closed off at its ends by plugs 35. Plugs 35 that can consist of injection-molded plastic parts in each case have a passage borehole 36 for visor axle 5, a passage borehole 37 for a fastening screw 28 as well as catch elements 38 that cooperate with the catch noses 34 on sled 33 for the purpose of axial catch engagement after longitudinal shifting.

The unit, according to FIG. 8, consisting of closure strip 23 with guide tube 24, sled 33 and plug 35 is attached to visor body 1 specifically by means of fastening screws 28 and the result is shown in FIG. 7. Prior to screwing on, the closure strip 23 is stuck on the upper longitudinal edge of visor body 1 in such a way that the bridge-shaped lugs 26 will pass through openings 20 in leather blank 18 and slits 14 in frame strip 11 and will also penetrate into the visor body material. After screwing on, envelope 18 is between frame strip 11 and closure strip 23 and envelope 18 is restretched around visor body 1 without any wrinkles in that bridges 25 engage the groove profile of frame strip 11, something which is shown clearly in FIG. 11.

The visor, prepared up to this point, according to FIG. 7, is thereafter equipped with the covering hood 3 as shown in FIG. 9. Covering hood 3 is practicably a U-shaped injection molded plastic part with closed front ends 39 in which, however, are provided passage openings for visor axle 5.

The longitudinal edges of covering hood 3 have a groove 40 to enable hook-shaped strips 31 to reach over. Groove 40 is formed by a continuing marginal tab 41 and by locally on-molded bridges 42 that are arranged in a row next to each other. Molded upon marginal tab 41 are clip noses 43 lined up in series next to each other. Covering hood 3 can thus be mounted by merely sticking it on and thereafter with its longitudinal edges sits in a manner firmly anchored upon the hook-shaped strips 31. At a front end 39, covering hood 3 has a tubular lug 44 with a ring-shaped groove 45. A groove, not shown, in the interior of covering hood 3, is used to receive bridge 32 and for additional stabilization.

The visor, according to FIG. 9, is to be completed by the assembly of visor axle 5, according to FIG. 1 2. As one can see, the visor axle 5 is made L-shaped and has a short axle leg 46 and a long axle leg 47. Short axle leg 46 is received rotatably in bearing block 4 and here again is fixed axially. Long axle leg 47 has a catch screw 48 in which engages sled 33 with countercatch elements, not shown, for the purpose of axial fixation. Furthermore, the long axle leg 47 has a flattening 49 as catch surface over an axial segment that cooperates with a brake element of sled 33 in order to retain visor body 1 in its nonuse position under the ceiling canopy. A circular groove 50 along the axle leg defines the position of visor body 1.

A stabilization element 51 is located between short axle leg 46 and long axle leg 47.

Bearing block 4 has a circular fastening plate 52 with boreholes 53 for the passage of fastening elements. The free end of the short axle leg 46 is pressed into a cone 54 of bearing block 4 and is retained by a mushroom head 55 that grips over cone 54 and that rests on the latter's rim.

Catch bridges 65 are molded upon the rim of fastening plate 52 that preferably consists of an injection-molded plastic part and these catch bridges serve to retain housing 8. Housing 8, likewise an injection-molded plastic part, consists of two cup-like housing halves 56 with in each case a groove or an inward-directed, collar-shaped lug 57 for the purpose of grasping behind the catch bridges 65. Housing halves 56 can be fixed against each other by means of catch recesses 58 on one housing half and by means of catch hooks 59 on the other housing half. A collar-shaped lug 60 on the housing halves 56 is provided for engaging the circular groove 45 of lug 44 on covering hood 3. After housing 8 has been attached, the visor, according to FIG. 1, has been completed.

What is claimed is:

1. A vehicle visor comprising:
   an axle for mounting a visor to a vehicle, said axle including a horizontally extending section;
   a visor body having a closure strip extending longitudinally along an edge of said visor body;
   a guide tube mounted to said closure strip and having a length less than the length of said closure strip;
   a sled slidably mounted within said guide tube and coupled axially to said horizontal section of said axle; and
   a cover having a length greater than said guide tube and extending over said guide tube.

2. The visor as defined in claim 1 wherein said guide tube includes longitudinally extending hook-shaped strips and said cover includes a groove which receives said strips.

3. The visor as defined in claim 2 wherein said cover further includes clip noses which snap-fit said cover onto said guide tube.

4. The visor as defined in claim 1 wherein said visor includes a cover which extends between said guide tube and said closure strip and is stretched when said guide tube is mounted to said closure strip.

5. The visor as defined in claim 1 wherein said guide tube includes catch noses extending into the path of movement of said sled to limit the excursion of said visor body along said axle.

* * * * *